United States Patent [19]
Rummell et al.

[11] Patent Number: 5,611,130
[45] Date of Patent: Mar. 18, 1997

[54] MULTI-POSITION ROTARY HEAD APPARATUS

[75] Inventors: Thomas H. Rummell, Cheektowaga; Jeffrey P. Weaver, E. Amherst; Robert T. Flaig, Holland; Thomas E. Burns, Tonawanda, all of N.Y.

[73] Assignee: Gemcor Engineering Corp., Buffalo, N.Y.

[21] Appl. No.: 84,353

[22] Filed: Jun. 28, 1993

[51] Int. Cl.$^6$ .............................. B23Q 5/54; B23C 1/12; B21J 15/02; B23B 11/00
[52] U.S. Cl. ...................... 29/34 B; 29/33 K; 29/243.53; 227/58; 409/201; 409/202; 409/212; 409/216
[58] Field of Search .............................. 29/34 B, 33 K, 29/26 A, 524.1, 525.2, 39, 40, 50, 243.53; 227/51, 52, 58, 60, 61, 152, 151, 66; 409/201, 202, 211, 212, 216; 408/37, 38, 39, 40, 42

[56] References Cited

U.S. PATENT DOCUMENTS

| | | | |
|---|---|---|---|
| 4,662,556 | 5/1987 | Gidlund | 29/703 X |
| 4,854,491 | 8/1989 | Stoewer | 227/58 |
| 4,864,702 | 9/1989 | Speller, Sr. et al. | 29/34 B |
| 4,885,836 | 12/1989 | Bonomi et al. | 29/34 B X |
| 4,967,947 | 11/1990 | Sarh | 227/52 |
| 5,033,174 | 7/1991 | Zieve | 29/34 B |
| 5,154,643 | 10/1992 | Catania | 29/34 B |
| 5,231,747 | 8/1993 | Clark et al. | 227/152 X |
| 5,404,641 | 4/1995 | Bratten et al. | 29/525.2 X |

Primary Examiner—William R. Briggs
Attorney, Agent, or Firm—Hodgson, Russ, Andrews, Woods & Goodyear LLP

[57] ABSTRACT

A method and apparatus for positioning tooling with respect to a curvilinear workpiece which is curved in a first direction extending along a plane substantially perpendicular to the longitudinal axis of the workpiece and which is curved in a second direction extending along a plane substantially parallel to the workpiece longitudinal axis, the degree of curvature in the first direction being greater than the degree of curvature in the second direction. An illustrative example is automatic drilling, inserting and upsetting one or two piece fasteners such as exterior skin rivets on an airplane fuselage. There is provided a head for supporting a plurality of tools at spaced locations around a central axis wherein each of the tools has an operational axis disposed substantially parallel to the central axis and an arrangement for moving the head along paths of travel relative to the workpiece to reach various locations on the workpiece where the tools are to perform operations on the workpiece. The head is rotated about the central axis to selectively position each of the tools at a location where the tool operational axis is in alignment with a work axis of the workpiece so that the tool can operate on the workpiece. In order to achieve finite normalization of the tooling to the workpiece surface, the head is pivoted about a first axis substantially perpendicular to the central axis and substantially perpendicular to the longitudinal axis of the workpiece, and the head is pivoted about a second axis substantially perpendicular to the central axis and substantially parallel to the longitudinal axis of the workpiece.

18 Claims, 12 Drawing Sheets

MULTI-POSITION ROTARY HEAD APPARATUS

BACKGROUND OF THE INVENTION

This invention relates to the art of positioning tooling with respect to a workpiece, and more particularly to a new and improved method and apparatus for positioning tooling with respect to a curvilinear workpiece.

One area of use of the present invention is positioning tooling in the form of drilling and riveting tools with respect to a curvilinear workpiece in the form of an aircraft fuselage section, although the principles of the present invention can be variously applied. Of particular interest in that area of use of the present invention are the skin lap splices and butt splices which are attached during a major join of an aircraft fuselage. These areas are inaccessible to conventional C-frame automatic fastening machines, and for a long time fasteners were installed by manual methods.

Recently, there has been proposed a combination of inner and outer positioning systems which carry or support inner and outer tooling, respectively, which engage the workpiece from opposite sides thereof during tooling operations thereon. Each of the inner and outer positioning systems moves the respective tooling through a large number of axes, and movements of the inner and outer positioning systems are controlled and coordinated by a control system.

In the foregoing combination, the outer positioning means includes an outer head which typically includes a linear array of tool stations which are successively translated to the workpiece along a linear path. As the number of tools increases, the required path length for tool translation can exceed allowable limits when other positioning requirements are considered. In addition, such heads with a linear array of tool stations are limited in the degree of angular travel about an axis parallel to the fuselage longitudinal axis thereby limiting access to certain locations on the fuselage.

It would, therefore, be highly desirable to provide a new and improved method and apparatus for positioning tooling with respect to a curvilinear workpiece such as an airplane fuselage wherein a relatively large number of tool stations can be provided in a manner compatible with other positioning requirements.

SUMMARY OF THE INVENTION

It is, therefore, a primary object of this invention to provide a new and improved method and apparatus for positioning tooling with respect to a curvilinear workpiece.

It is a further object of this invention to provide such a method and apparatus for positioning tooling with respect to a curvilinear workpiece which is curved in a first direction extending along a plane substantially perpendicular to the longitudinal axis of the workpiece and which is curved in a second direction extending in a plane substantially parallel to the workpiece longitudinal axis, wherein the degree of curvature in the first direction is greater than the degree of curvature in the second direction.

It is a further object of this invention to provide such a method and apparatus for positioning tooling which functions effectively with a relatively large number of tool positions for operation on such a curvilinear workpiece.

It is a further object of this invention to provide such a method and apparatus for positioning tooling which readily accesses locations along paths in the aforesaid first direction on such a curvilinear workpiece.

It is a further object of this invention to provide such a method and apparatus for positioning tooling through a relatively large number of axes of movement.

It is a further object of this invention to provide such a method and apparatus for positioning tooling which achieves finite normalization of the tooling to the workpiece at all the curved surface portions thereof.

It is a further object of this invention to provide such a method and apparatus for positioning tooling having application to automatic drilling, inserting and upsetting one or two piece fasteners such as exterior skin rivets on an airplane fuselage.

It is a further object of this invention to provide such a method and apparatus for positioning tooling which is efficient and effective in operation and relatively simple in structure and function.

The present invention provides a method and apparatus for positioning tooling with respect to a curvilinear workpiece which is curved in a first direction extending along a plane substantially perpendicular to the longitudinal axis of the workpiece and which is curved in a second direction extending along a plane substantially parallel to the workpiece longitudinal axis, the degree of curvature in the first direction being greater than the degree of curvature in the second direction. An illustrative example is automatic drilling, inserting and upsetting one or two piece fasteners such as exterior skin rivets on an airplane fuselage. There is provided head means for supporting a plurality of tools at spaced locations around a central axis wherein each of the tools has an operational axis disposed substantially parallel to the central axis, and means for moving the head means along paths of travel relative to the workpiece to reach various locations on the workpiece where the tools are to perform operations on the workpiece. The head means is rotated about the central axis to selectively position each of the tools at a location where the tool operational axis is in alignment with a work axis of the workpiece so that the tool can operate on the workpiece. In order to achieve finite normalization of the tooling to the workpiece surface, the head means is pivoted about a first axis substantially perpendicular to the central axis and substantially perpendicular to the longitudinal axis of the workpiece, and the head means is pivoted about a second axis substantially perpendicular to the central axis and substantially parallel to the longitudinal axis of the workpiece. The means for moving the head means along paths of travel relative to the workpiece includes means for moving the head means along a path substantially parallel to the longitudinal axis of the workpiece, means for moving the head means along a path corresponding the curvature of the workpiece in the first direction in the plane disposed substantially perpendicular to the workpiece longitudinal axis, means for moving the head means along a path toward and way from the workpiece, and means for moving the head means along a path substantially perpendicular to the longitudinal axis of the workpiece.

The foregoing and additional advantages and characterizing features of the present invention will become clearly apparent from a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
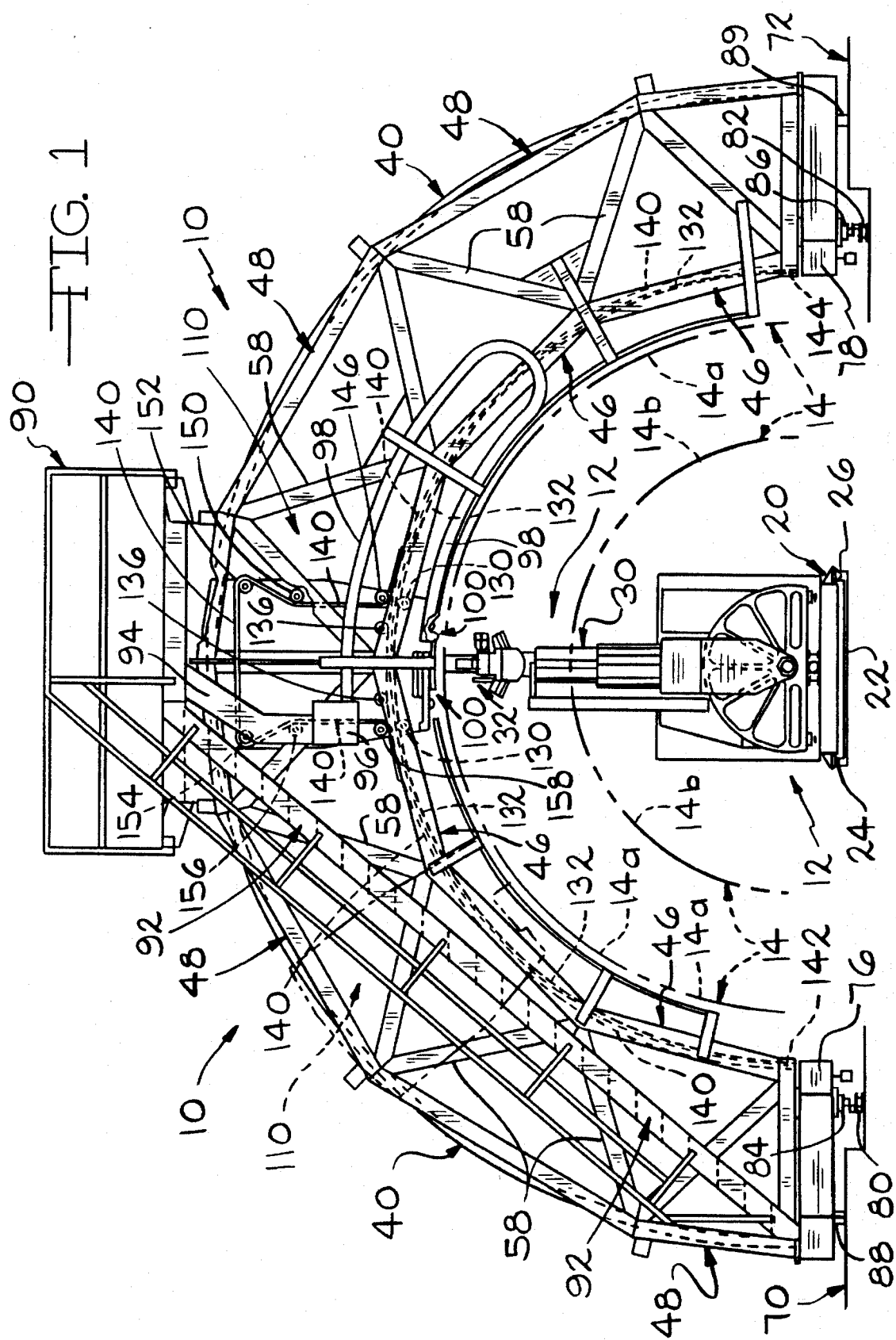
FIG. 1 is an end elevational view of the apparatus for positioning tooling according to the present invention in operative position on one side of a workpiece.

Referring now to FIG. 1, there is shown an outer tooling positioning system 10 and an inner tooling positioning system 12, the terms inner and outer being in reference to a curvilinear workpiece diagrammatically designated 14. In the present illustration workpiece 14 is in the form of an airplane fuselage which is cylindrical in cross section as indicated in FIG. 1 and which is curvilinear in a longitudinal direction which is into the plane of the paper as viewed in FIG. 1 and as indicated by the larger and smaller diameter sections designated 14a and 14b.

The method and apparatus as illustrated herein provides automatic drilling, inserting and upsetting of fasteners such as exterior skin rivets on an aircraft fuselage such as the illustrative workpiece 14. The outer and inner positioning systems 10 and 12, respectively, carry or support outer and inner tooling, respectively, which engage the workpiece 14 during the manufacturing, i.e. fastening, operation. The inner tooling typically can include a clamp sleeve and an inner riveting anvil. The outer tooling typically will include a pressure foot bushing, a drill spindle, an outer riveting anvil, and various workpiece inspection devices as will be described in detail presently.

The outer positioning system 10 includes the method and apparatus for positioning tooling according to the present invention and will be described in detail presently. The inner positioning system 12 forms no part of the present invention and therefore will be summarized briefly. The inner positioning system 12 includes carriage means generally designated 20 which is supported on a surface 22 spaced from workpiece 14 and which can comprise a series of platforms supported on the seat tracks of the fuselage assembly. Whereas the outer positioning system 10 faces the convex outer surface of workpiece 14, the inner positioning system 12 faces the concave inner surface of workpiece 14 and is adapted for movement along the aforementioned supporting surface in a direction along, i.e. substantially parallel to, the longitudinal axis of workpiece 14. To this end, carriage means 20 rides along longitudinally extending rails 24, 26 provided on the platforms 22 and is moved by suitable drive arrangement such as a rack and pinion drive.

The inner positioning system 12 further comprises arm means generally designated 30 which is carried by carriage means 20 and which is adapted for pivotal movement on carriage means 20 about an axis substantially parallel to the longitudinal axis of workpiece 14. Arm means 30 is telescoping and therefore movable toward and away from workpiece 14. Arm means 30 carries head means 32 on the outer end thereof which head means 32 includes the aforementioned clamp sleeve and inner riveting anvil. As the inner positioning system 12 moves along paths relative to workpiece 14 to reach various locations on the workpiece where the tools are to perform operations on the workpiece, outer positioning system 10 follows inner positioning system 12 under control of a control system (not shown). For a more detailed description of the structure and operation of an inner positioning system like system 12, reference may be made to pending U.S. patent application Ser. No. 08/048,420 filed Apr. 14, 1993 entitled "Method and Apparatus For Positioning Tooling" and assigned to the assignee of the present invention, the disclosure of which is hereby incorporated by reference.

Figure 2:
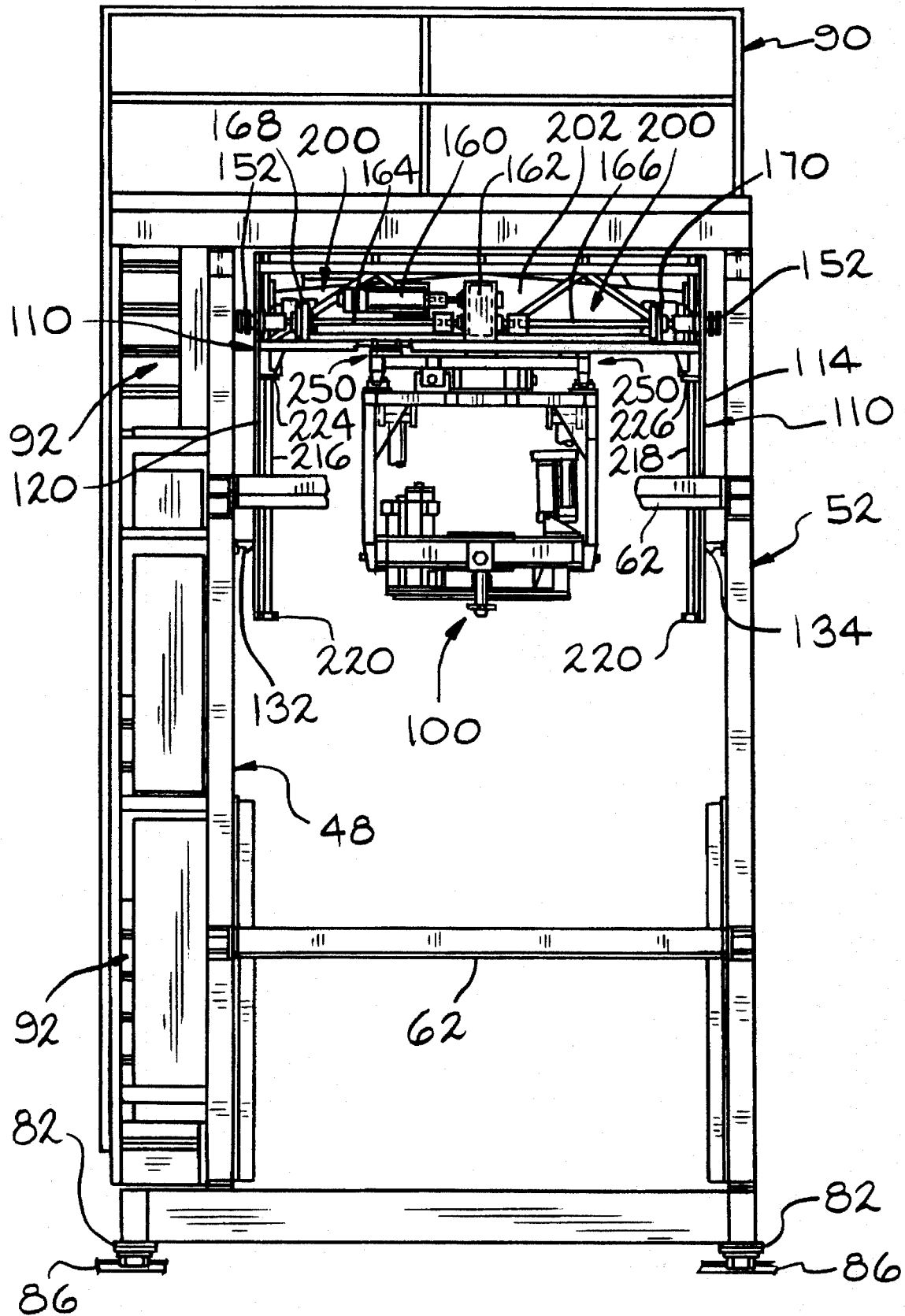
FIG. 2 is a side elevational view of the arrangement of FIG. 1 with parts removed and showing the head means according to the present invention in its fully retracted position in a direction away from the workpiece.
Figure 3:
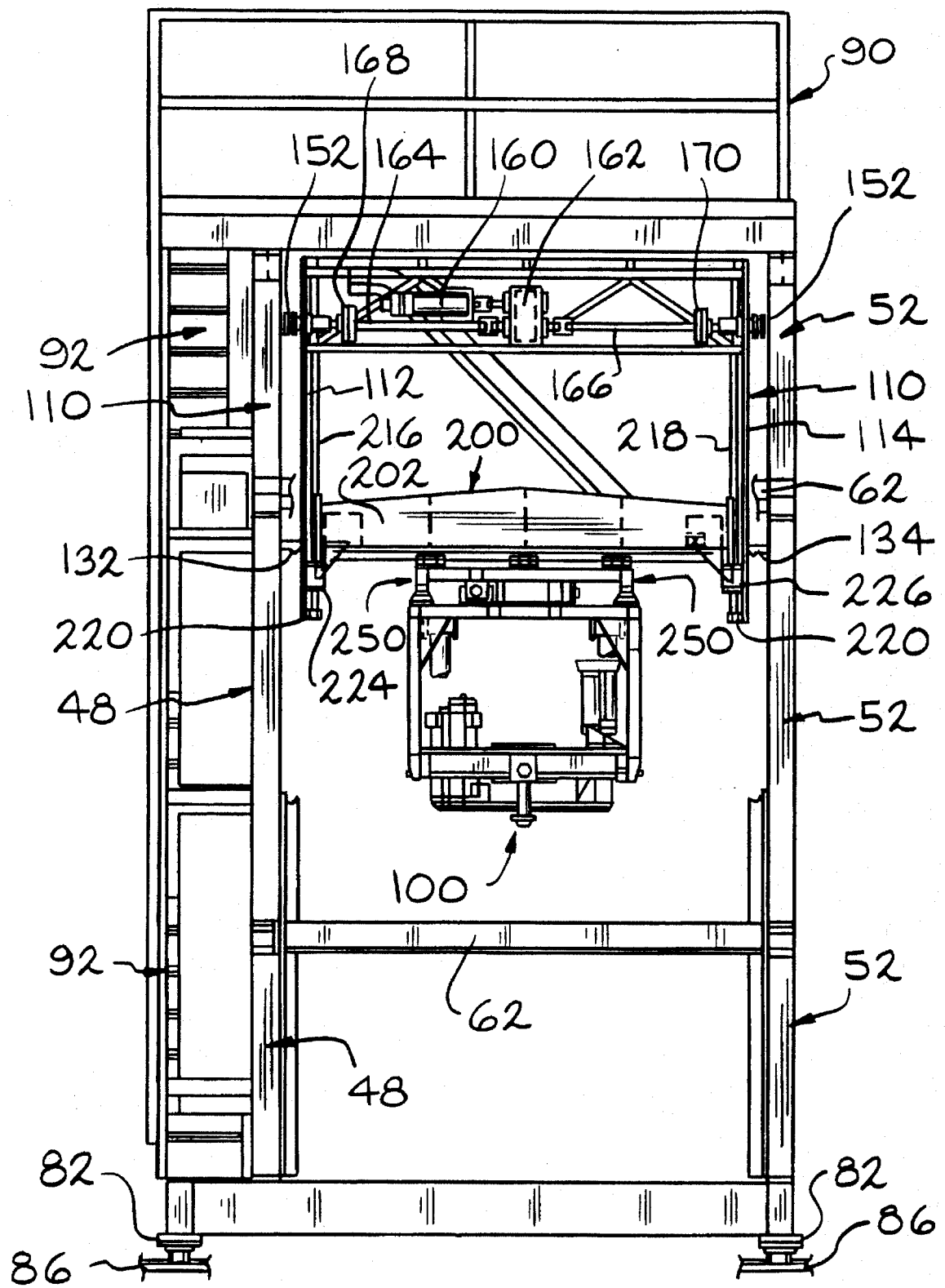
FIG. 3 is a view similar to FIG. 2 and showing the head means according to the present invention in its fully extended position in a direction toward the workpiece.

The outer positioning means 10 comprises outer frame means generally designated 40, which also may be considered a carriage means, which extends about workpiece 14 and which is movable along workpiece 14 in a direction substantially parallel to the longitudinal axis of workpiece 14. In particular, frame means 40 has a first portion substantially in the shape of a half-ring which extends about workpiece 14 in a direction substantially perpendicular to the longitudinal axis of workpiece 14. Frame means 40 also has a second portion in the form of a linear section which extends along workpiece 14 in a direction substantially parallel to the workpiece longitudinal axis. The first or ring-like portion of frame means 40 is defined by a series of beams or like structural members joined end-to-end in a manner defining inner and outer substantially arcuate frame structures 46 and 48, respectively. An identical arrangement of beams defining inner and outer substantially arcuate frame structures is in spaced relation to structures 46, 48 in a direction longitudinally of workpiece 14, the outer structure being designated 52 in FIGS. 2 and 3. The inner frame structures, i.e. structure 46, define an inner dimension which is slightly larger than the outer diameter of workpiece 14 at its largest cylindrical cross-section so that frame means 40 is freely axially movable along the entire axial length of workpiece 14. The beams of the inner and outer structures 46 and 48, respectively, are joined by a truss-like arrangement of frame link members 58. An identical truss-like arrangement of link members (not shown) is provided in the longitudinally spaced arrangement of substantially arcuate frame structures. As shown in FIGS. 2 and 3, a series of frame spacer members 62 extend longitudinally between the two frame structures and are at circumferentially spaced locations along the substantially arcuate path defined by the frame structures. The length of each spacer member 62 is such that it will allow micro-positioning of a head means carried by frame means 40 over a distance of one frame bay without repositioning frame means 40 in a manner which will be described presently. The frame means 40 thus is of truss-like construction and the components thereof all can be of relatively light weight metal tubing.

Frame means 40 typically is supported relative to workpiece 14 by a pair of scaffold structures, the upper surfaces of which are designated 70 and 72 in FIG. 1, which are located on opposite sides of workpiece 14 and both of which extend along workpiece 14 generally parallel to the longitudinal axis thereof. The scaffold structures include a series of vertically disposed legs (not shown) for supporting the upper platform portions thereof including surfaces 70 and 72 in a known manner.

There is also provided means for moving frame means 40 longitudinally along the workpiece 14. This can be accomplished in various ways, and in the present illustration a rack and pinion drive with linear bearings is provided between the lower ends of frame means 40 and the platform surfaces 70 and 72. In particular, there is provided a pair of dual synchronized drives indicated diagrammatically at 76 and 78 in FIG. 1. Each of the drives, in turn, comprises a precision ground and hardened gear rack provided on corresponding rail assemblies 80 and 82 and an AC synchronomous servo motor driven pinion gear on frame means 40 engaging the rack. Linear bearing assemblies 84 and 86 on frame means 40 slide on the aligned rail assemblies 80 and 82, respectively, on platforms 70 and 72, respectively, as viewed in FIG. 1. Support wheels 88 and 89 rotatably mounted on frame means 40 roll on the supporting surfaces 70 and 72, respectively. Synchronization of the drives is maintained by dual feedback for position verification of each drive through the use of encoders as is well understood by those skilled in the art. Thus, frame means 40 provides macro movement in a direction parallel to the longitudinal axis of workpiece 14, which direction is designated herein as the X axis.

As shown in FIG. 1, frame means 40 supports a platform structure 90 which carries various monitoring and control equipment for the positioning system. Access to the platform 90 is by means of a stairway 92 secured to the truss structure. A duct 94 houses electrical cables from equipment on platform 90 to an electrical junction box 96 from which a flexible electrical cable carrier 98 extends for connection to the positioning system in a manner which will be described.

The tool positioning system according to the present invention includes head means generally designated 100 in FIGS. 1–3 for supporting a plurality of tools at spaced locations around a central axis wherein each of the tools has an operational axis disposed substantially parallel to the central axis, all of which will be described in detail presently. The head means 100 is carried by the frame means 40 for movement along the X axis, i.e., longitudinally along workpiece 14, and is movable within the frame means 40, all in a manner which will be described in detail presently.

The tool positioning system according to the present invention has seven axes of movement to accommodate the curvature of workpiece 14, and in addition the head means 100 is rotatable about an axis as previously described. The first axis of movement, designated herein the X axis as described above, is macro horizontal travel of frame means 40 in a direction parallel to the length or longitudinal axis of workpiece 14 to span a frame bay. The second axis, designated herein the X-1 axis, is finite or micro travel of head means 100 within the frame bay for a purpose which will be described. This X-1 axis also is parallel to the longitudinal axis of workpiece 14.

At each location where frame means 40 is parked along workpiece 14 as described hereinabove, head means 100 moves along the arcuate or semi-circular contour of workpiece 14 as viewed in FIG. 1, this being along a path in a plane disposed substantially perpendicular to the longitudinal axis of workpiece 14. In the present illustration where workpiece 14 is an aircraft fuselage, this is referred to as circumferential travel of head means 100 along the butt splice and also referred to as macro positioning. This is the third axis of movement and is designated herein the a axis. At each location of head means 100 during a axis movement, there is pivotal movement of head means 100 about an axis parallel to the longitudinal axis of workpiece 14, and this provides finite normalization of head means 100 to the surface of workpiece 14 along the butt splice. This is the fourth axis of movement and is designated herein the a-1 axis. In addition, head means 100 is moved in a direction substantially perpendicular to the longitudinal axis of workpiece 14, and this is the fifth axis of movement which is designated herein the Y axis. Such Y axis movement co-operates with a-1 axis movement in a manner which will be described.

During the macro travel of frame means 40 along workpiece 14 parallel to the longitudinal axis thereof, i.e. along the X axis, and during the finite travel of head means 100 within the frame bay defined by frame means 40, head means 100 is moved along a path toward and away from workpiece 14. This is the sixth axis of movement and is designated herein the Z axis. During such Z axis movement, head means 100 is moved in a direction substantially perpendicular to the surface of workpiece 14, and such perpendicularity of head means 100 is maintained by finite normalization of head means 100. Such finite normalization, in turn, is achieved by pivotal movement of head means 100 about an axis substantially perpendicular to the longitudinal axis of workpiece 14. This is the seventh axis of movement and is designated the b axis. The previously mentioned X-1 axis movement also co-operates with b axis movement in a manner which will be described.

An illustrative arrangement for moving frame means 40 in the X direction, i.e. longitudinally along the workpiece, has been described in connection with FIG. 1. The structural arrangements for providing the foregoing movements in the a, Z, X-1, Y, a-1 and b axes or directions, and the rotation of head means 100, now will be described. There is provided carriage means generally designated 110 which is movably carried by frame means 40 and adapted for movement within frame means 40 about workpiece 14 as viewed in FIG. 1 along an arcuate path which corresponds to the curvature of workpiece 14 and which path is disposed in a plane substantially perpendicular to the longitudinal axis of workpiece 14. Carriage means 110 is also designated herein the a axis carriage, and it carries therein the head means 100 and other components of the positioning system in a manner which will be described. In addition to showing carriage means 110 substantially mid-way along its path of travel in frame means 40, FIG. 1 also illustrates carriage means at another location on such path to the left as viewed in FIG. 1. Carriage means 110 comprises a pair of spaced apart end plates of walls 112 and 114 as viewed in FIGS. 2 and 3 in mutually parallel relation and disposed substantially perpendicular to the longitudinal axis of workpiece 14. End plates 112, 114 are joined together by a pair of mainframe members 116 and 118 shown in FIG. 5 along with a truss-like arrangement of link members 120 and auxiliary frame members 122 and 124.

There is provided means for moving carriage means 110 along within frame means 40 about workpiece 14 along an arcuate path corresponding to the curvature of workpiece 14 which path is disposed in a plane substantially perpendicular to the longitudinal axis of workpiece 14. In particular, carriage means 110 is supported by engagement between V-grooved cam followers 130 rotatably connected to carriage end plates 112, 114 at the lower ends thereof as viewed in FIG. 1 and a pair of mating V-groove arcuate rails or tracks 132 and 134 mounted on the fore and aft sections of frame means 40 as shown also in FIGS. 2 and 3. Cam follower rollers 136 rotatably connected to carriage end plates 112, 114 also engage tracks 132, 134. An azimuthal positioning system comprises a pair of multi-link roller chains fore and aft, the forward one being shown at 140 in FIG. 1, wherein each chain is fitted to a mating depression on the outboard side of the corresponding V-groove rail or track 132, 134. Each chain is fixed at one end, for example end 142 of chain 140, to frame means 40 at one end of the accurate path for carriage 110, is drivingly coupled to carriage means 110 between the ends of the chain, and is spring tensioned at the other end, for example end 144 of chain 140, to frame means 40 at the other end of the arcuate path for carriage 110. As shown in FIG. 1, chain 140 leaves its depression on the outboard side of track 132, is guided around a first idler sprocket 146, extends generally vertically and around a second idler sprocket 150 rotatably connected to carriage end plate 112, is engaged by a first drive sprocket 152 journalled in end plate 112, extends generally horizontally and then is engaged by a second drive sprocket 154, then extends vertically downwardly around a third idler sprocket 156 rotatably connected to end plate 112 and is guided by a fourth idler sprocket 158 so as to be returned to its depression on the outboard side of track 132. An identical arrangement of idler sprockets and drive sprockets is associated with the other carriage end plate 114 and operatively associated with the other chain. By virtue of the foregoing arrangement, when drive sprockets 152, 154 are rotated in one direction, carriage means 110 moves in one direction along its path, for example, around to the left as illustrated in FIG. 1, and when drive sprockets 152, 154 are rotated in the opposite direction, carriage means 110 moves in the opposite direction, i.e., around to the right as viewed in FIG. 1.

Figure 4:
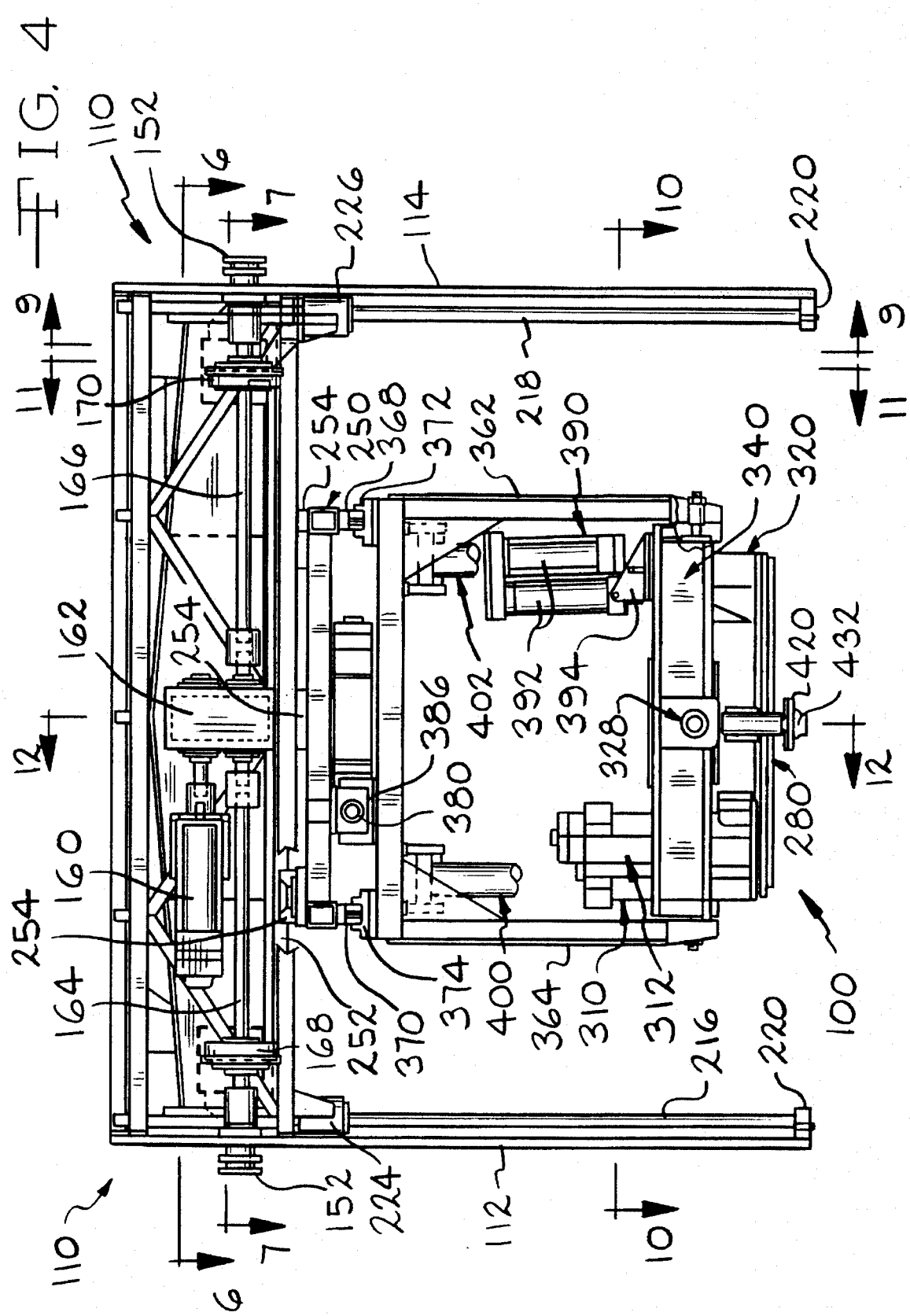
FIG. 4 is a side elevational view similar to FIG. 2 but enlarged and with parts removed.
Figure 5:
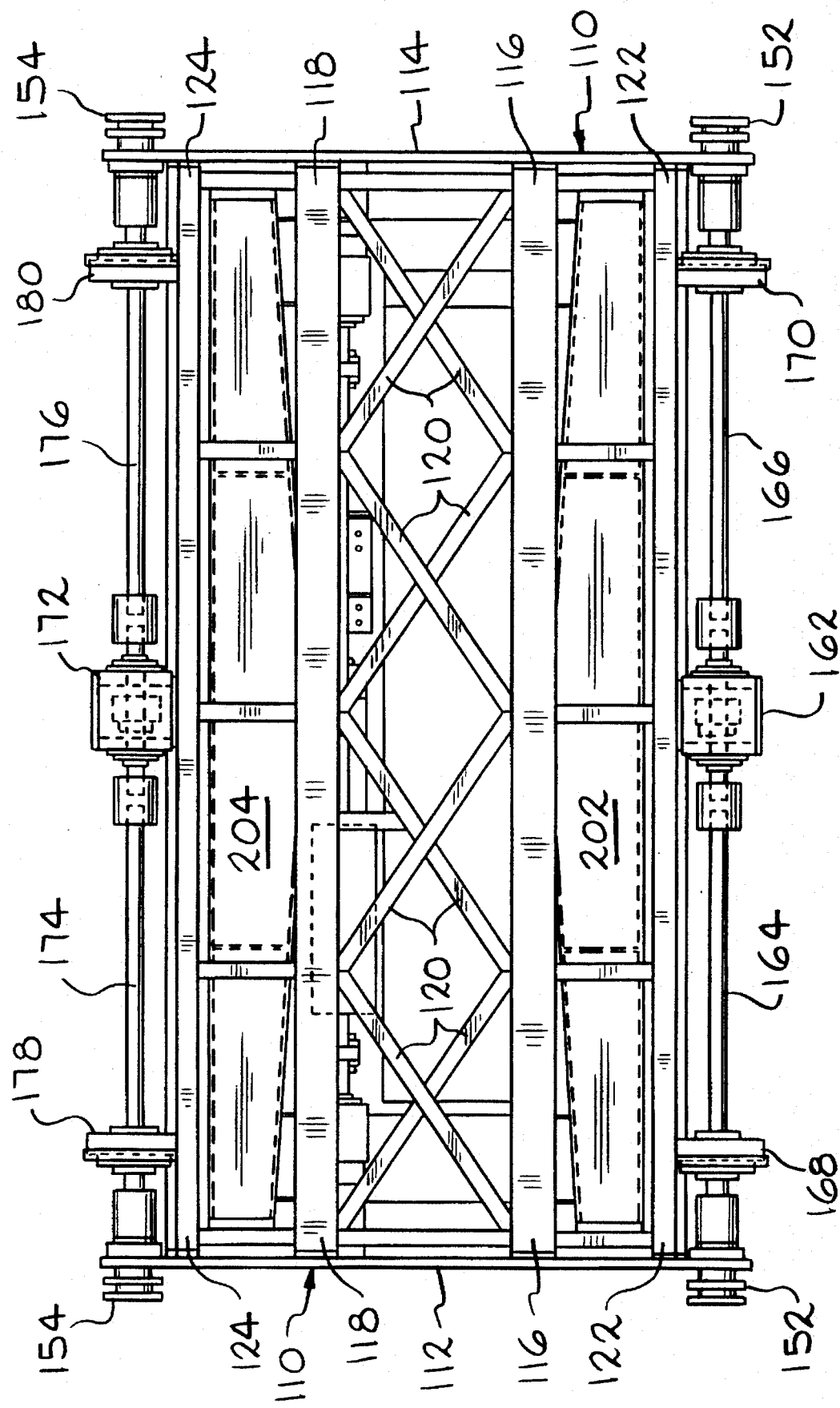
FIG. 5 is a top plan view of the apparatus of FIG. 4.

Drive sprockets 152, 154 are operated by an a axis drive arrangement on carriage means 110 and shown in FIGS. 2, 3 and 4–7. In particular, sprockets 152 are driven by the combination of a motor 160, gear box 162, drive shafts 164, 166 and speed reducers 168, 170 as shown in FIG. 5. Similarly, sprockets 154 are driven by an identical arrangement of motor (not shown), gear box 172, drive shafts 174, 176 and speed reducers 178, 180. The two drive combinations are arranged in an anti-backlash configuration. The positional location of carriage means 110 within frame means 40 along the path of travel in the a axis direction is determined by a suitable encoder arrangement (not shown) in a known manner.

While the foregoing arrangement for moving carriage means 110 along frame 40 is preferred, alternative arrangements can be employed such as the combination of curved racks, i.e., semi-circular segments of a large ring gear, on frame 40 and motor driven pinions on carriage means 110, can be employed.

As previously mentioned, the a axis carriage means 110 carries therein the head means 100 along with other components. One of those other components is a carriage means generally designated 200 in FIGS. 2–8 which also is referred to herein as the Z axis carriage. Carriage means 200 is moved toward and away from workpiece 14 to provide corresponding movement of head means 100 toward and away from workpiece 14 to accommodate the curvature of workpiece 14 along the longitudinal axis thereof. Carriage means 200 is shown in FIG. 2 at its maximum distance away from the surface of workpiece 14 and is shown in FIG. 3 moved toward workpiece 14 at or near its closest position to the surface of workpiece 14.

Figure 6:
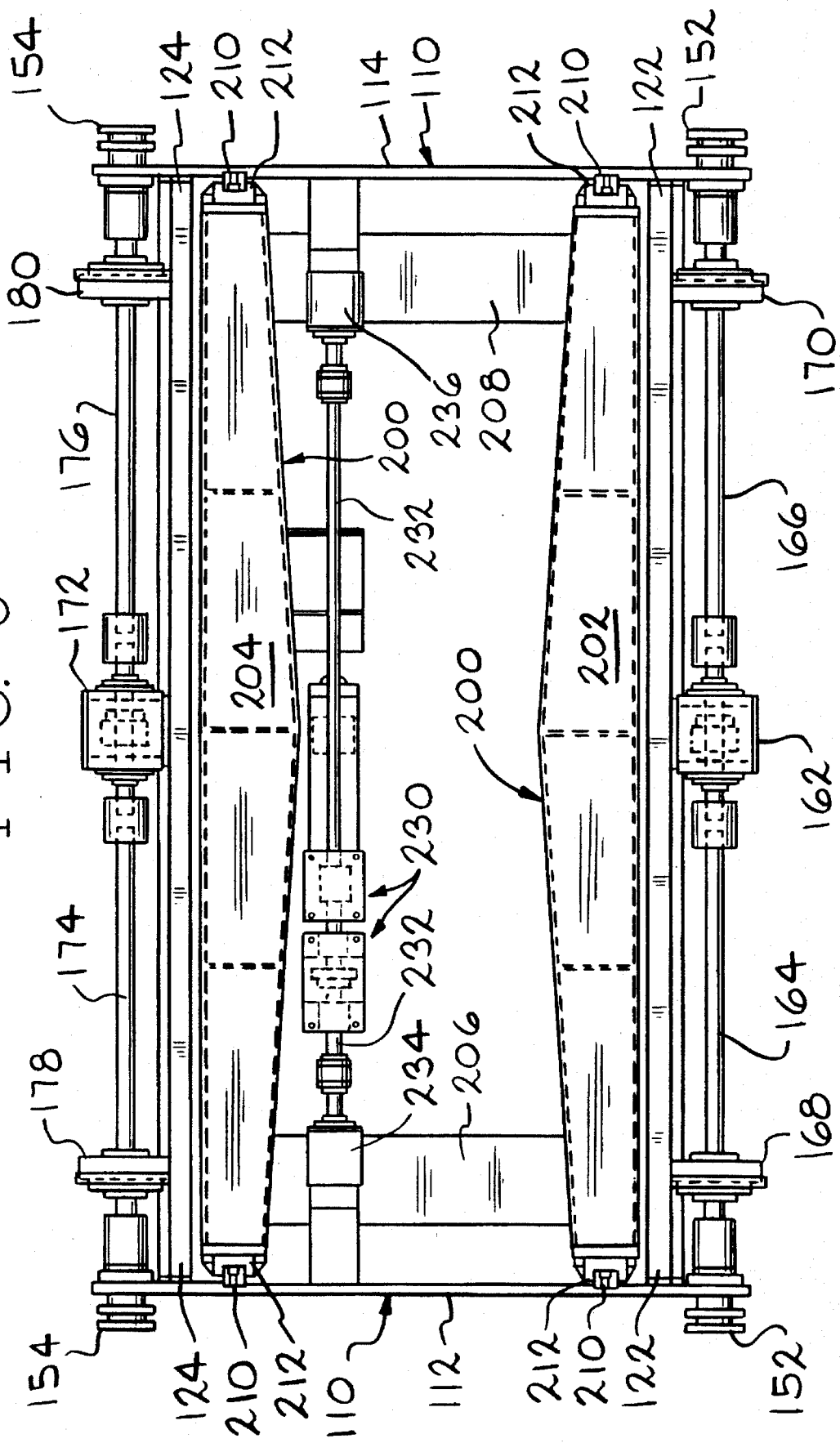
FIG. 6 is a plan view taken about line 6—6 in FIG. 4.
Figure 7:
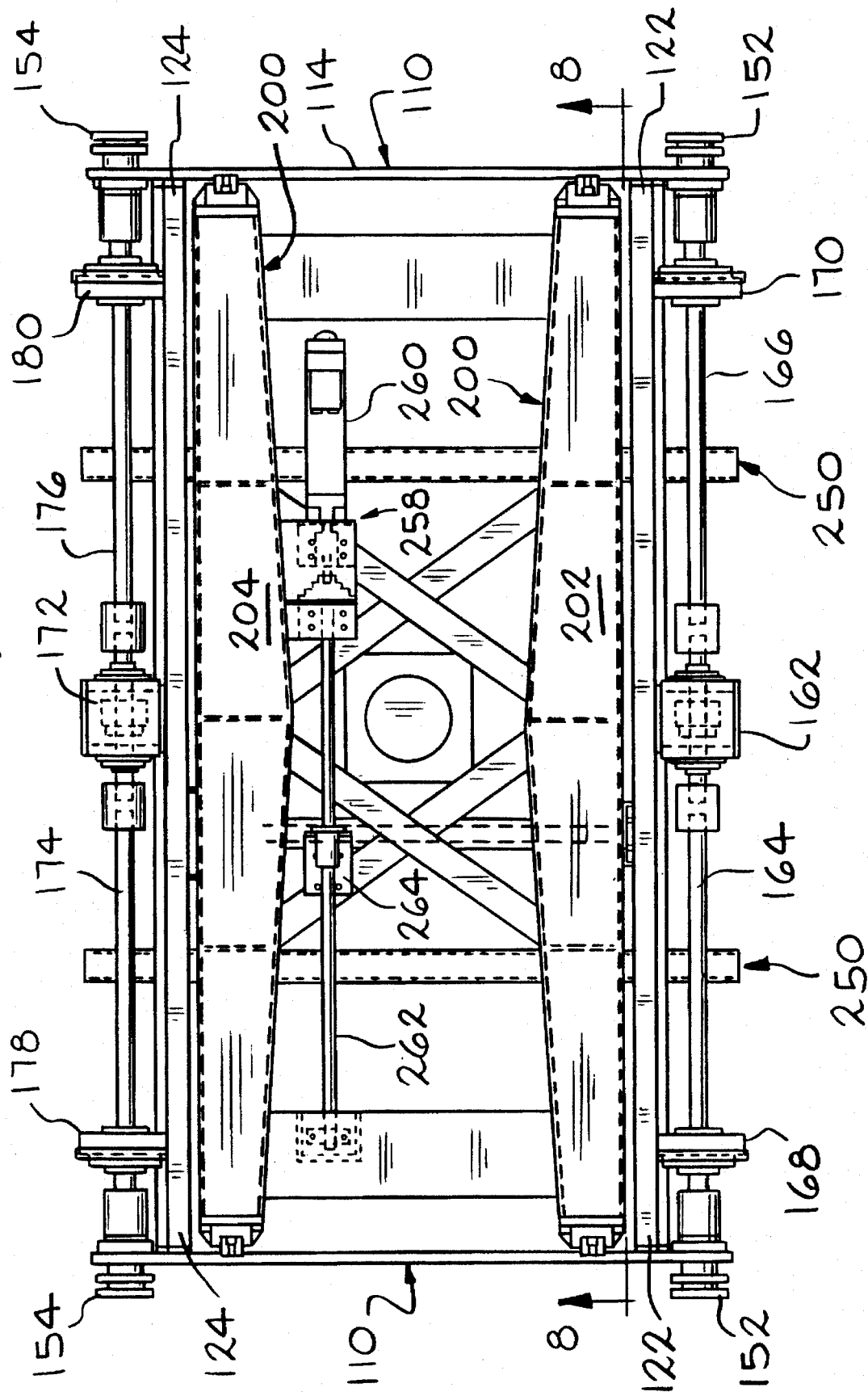
FIG. 7 is a plan view taken about line 7—7 in FIG. 4.
Figure 8:
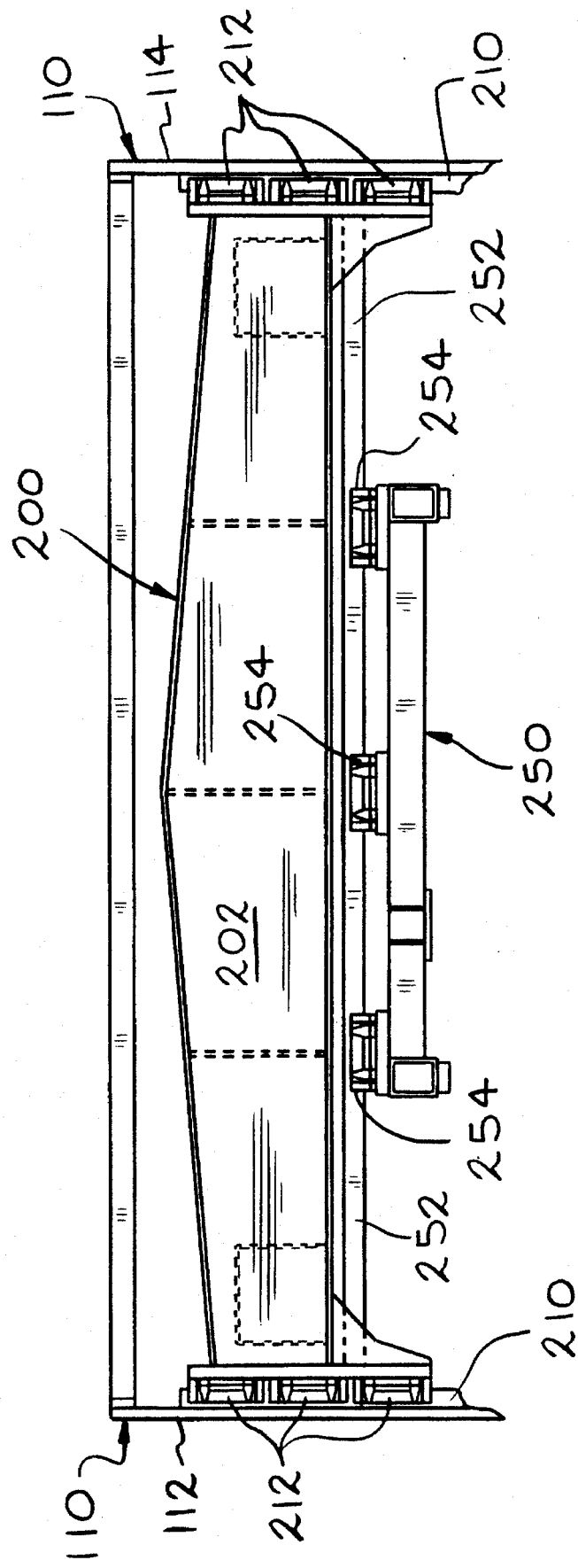
FIG. 8 is an elevational view taken about line 8—8 in FIG. 7.
Figure 9:
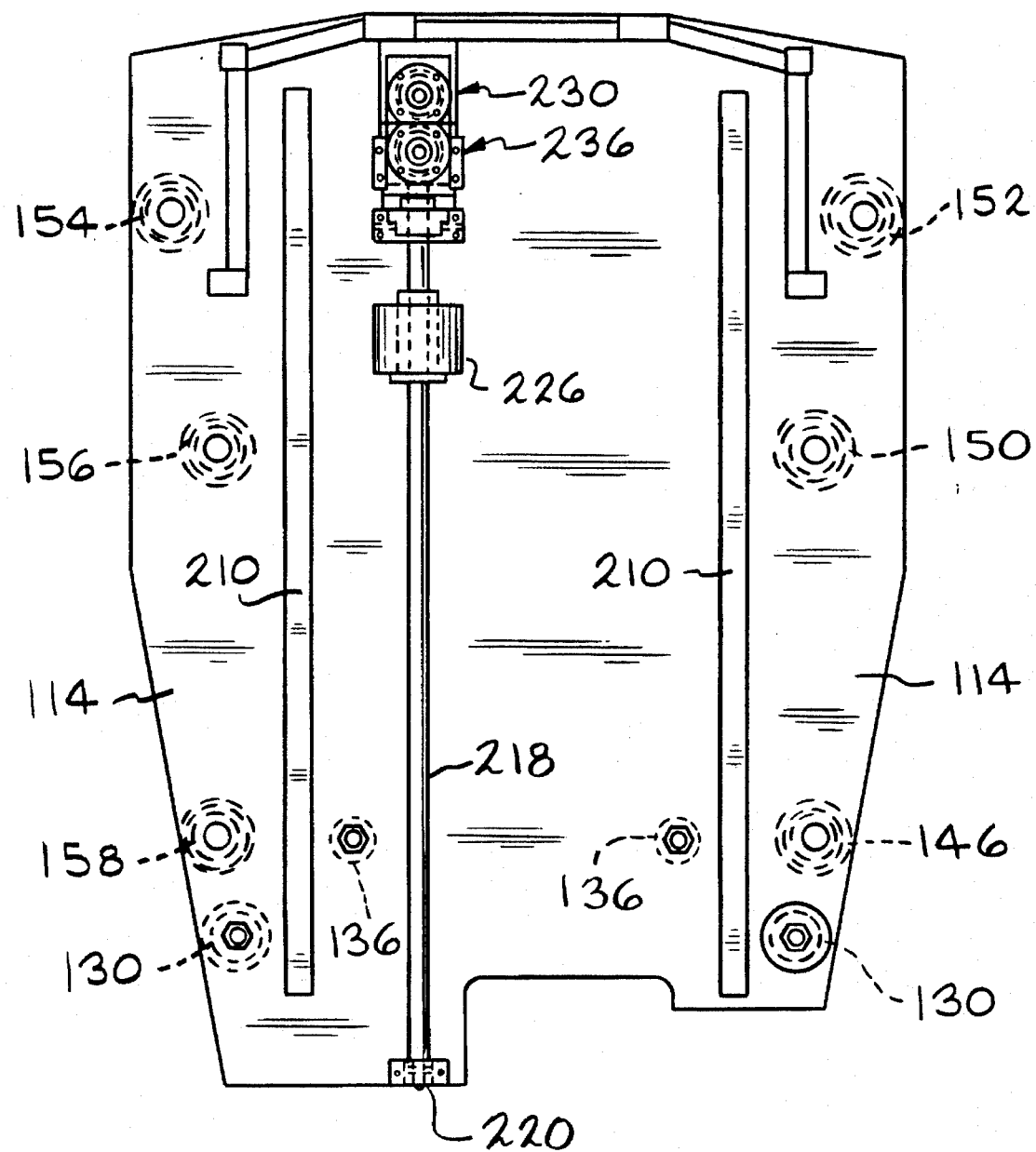
FIG. 9 is an elevational view taken about line 9—9 in FIG. 4.

The Z axis carriage means 200 comprises a pair of main frame or structural members 202, 204 which are substantially parallel to each other and extend between A axis carriage end plates 112, 114 as shown in FIGS. 5–7. The main frame members 202, 204 are joined at the ends thereof by a pair of cross frame members 206, 208 which are disposed substantially perpendicular to members 202, 204 and substantially parallel to end plates 112, 114. Movement of carriage means 200 is guided by a pair of spaced-apart parallel rails or precision linear ways 210 provided on the inwardly facing surfaces of end plates 112, 114 which rails 210 receive linear bearings 212 on the opposite ends of the Z axis carriage main frame members 202, 204 as shown in FIG. 6. The linear ways 210 are disposed with the longitudinal axes thereof parallel to the desired direction of movement of Z axis carriage 200 toward and away from workpiece 14 as shown also in FIG. 9. The Z axis carriage means 200 is moved by a drive arrangement comprising a pair of ballscrews 216 and 218 journalled in bearings 220 on a axis carriage end plates 112, 114 and drivingly connected through a pair of nut members 224 and 226, respectively, mounted on the Z axis carriage 200, such as on the cross frame members 206, 208. Ball screws 216 and 218 are driven by the combination of a motor/gear box 230, output shafts 232 and right angle gear boxes 234 and 236 to which the ball screws 216 and 218 are drivenly connected. The combination is supported by the a axis carriage, for example, via brackets on the end plates 112, 114 and the truss-like arrangement of frame members between end plates 112, 114. Rotation of ball screws 216, 218 in one direction moves Z axis carriage means 200 toward workpiece 14 to the position of FIG. 3, and rotation of ball screws 216, 218 in the opposite direction moves carriage 200 away from workpiece 14 to the position of FIG. 2.

Thus, the a axis carriage means 110 carrying the Z axis carriage means 200 is indexed about the circumference of workpiece 14, and at each of those locations the Z axis carriage means 200 is indexed to the workline, i.e., moved toward workpiece 14 by the drive arrangement previously described and guided by the linear bearings 212 and linear ways 210. The location of the Z axis carriage means 200 at any position during the movement toward and away from the workpiece 14 is determined by a suitable encoder arrangement in a known manner.

Figure 11:
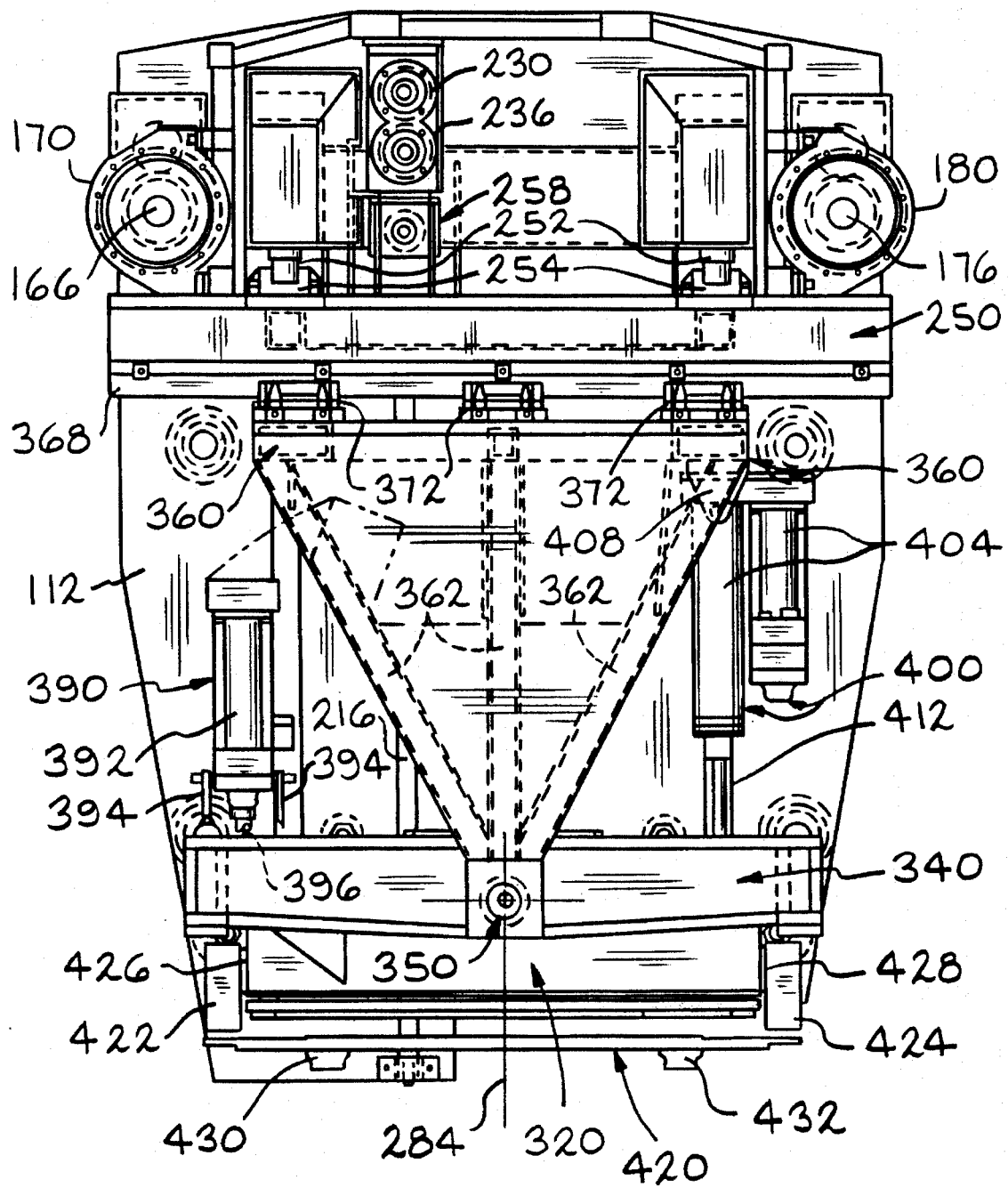
FIG. 11 is an elevational view taken about line 11—11 in FIG. 4.

Head means 100 is coupled to Z axis carriage means 200 by arrangements which provide movements along the various other axes described hereinabove. One is movement along the X-1 axis which is finite or micro travel of head means 100 within the frame bay. To this end there is provided an X-1 axis frame structure generally designated 250 in FIGS. 2–4, 7, 8, 11 and 12. Head means 100 is coupled to the X-1 axis frame structure 250 in a manner which will be described. The X-1 axis frame structure 250 is movably connected to Z axis carriage means 200 by means of rails on the carriage main frame members 202, 204 and linear bearings on the X-1 axis frame. For example, an arrangement of rail 252 on frame member 202 and bearings 254 on frame structure 250 is illustrated in FIGS. 2–4, 8 and 11. An identical arrangement of rail and bearings is associated with frame member 204. The X-1 axis frame 250, and with it head means 100, is moved linearly along Z axis carriage 200 by an X-1 axis drive arrangement 258 comprising a motor 260, ballscrew 262 and nut 264 as shown in FIGS. 7 and 11. Motor 260 is supported by Z axis carriage 200 in a suitable manner and nut 264 is mounted to X-1 axis frame 250. Accordingly, operation of drive arrangement 258 moves X-1 axis frame 250, and with it head means 100, along the X-1 axis which is parallel to the longitudinal axis of workpiece 14, the direction of movement depending upon the direction of rotation of ballscrew 262.

The foregoing arrangement eliminates the need to move the entire frame means 40 when indexing from one work location to another along workpiece 14, i.e., indexing from rivet to rivet. Thus, the foregoing arrangement provides micro movement along the X-1 axis within an entire frame bay which is a longitudinal dimension on workpiece 14 spanned by the end plates or walls 112 and 114 of a axis carriage means 110. In the illustrative example where workpiece 14 is an airplane fuselage, the total travel is determined by the requirement to rivet a lap joint across the circumferental butt joint, as located in the contoured portion of the fuselage. The foregoing allows frame means 40 to be parked at each frame bay location with all the travel of head means 100 being within the frame bay being along the X-1 axis. This, in turn, reduces overall vibration of the system, enhances cycle time because sensors in the system will not have to settle from system vibration due to motion of frame means 40, and improves system accuracy since a lighter load, i.e., not the entire frame means 40, is being indexed within the frame bay. The location of X-1 axis frame 250 at any position is determined by a suitable encoder arrangement in a known manner.

Turning now to the head means 100, it supports a plurality of tools at spaced locations around a central axis wherein each of the tools has an operational axis disposed substantially parallel to the central axis. As shown, for example, in FIGS. 4 and 10, head means 100 includes transfer means in the form of a disc 280 which defines a plurality of tool stations 282, in the present illustration eight, at spaced angular locations around a central axis of rotation 284, designated herein the C axis. In the illustrative head means shown, there is provided two drills 286, an electromagnetic fastener upset device 288, a pneumatic fastener upset device 290, an optical fastener monitor 292 and a pair of hole inspection devices 294. Each tool has an operational axis, for example, the spindle axis of each drill 286, which is disposed substantially parallel to the C axis 284. Each tool station has provision for supporting the body of the tool while a component of the tool, such as the spindle of each drill 286, moves through an opening 296 in transfer plate 280 when operating on workpiece 14. Transfer plate 280 also is provided with a plurality of radially extending load bearing gussets 298 located between each of the tool station to carry the static and dynamic loads outwardly to the circumference of plate 280.

There is also provided means for rotating head means 100, specifically the transfer means 280, about the C axis 284 to selectively position each of the tools at a location where the tool operational axis is in alignment or registry with a work axis of the workpiece 14. For example, when drilling a hole in workpiece 14, the work axis would extend through the center of the hole and be disposed substantially normal to a plane containing the portion of the surface of workpiece 14 immediately adjacent the periphery of the hole. Transfer disc 280 is supported at its periphery by a ring bearing shown at 304 in FIGS. 10 and 12. Ring bearing 304 is stationary and coupled to other components which will be described and transfer disc 280 is rotatable within ring bearing 304 and about the C axis 284. Ring bearing 304 also is provided at its periphery with a ring gear 306 which meshes with the output gears of a pair of motor/gearbox combinations 310 and 312 for rotating disc 280. The motor/gearbox combinations 310, 312 are set up in an anti-backlash configuration and are supported in a manner which will be described.

Figure 10:
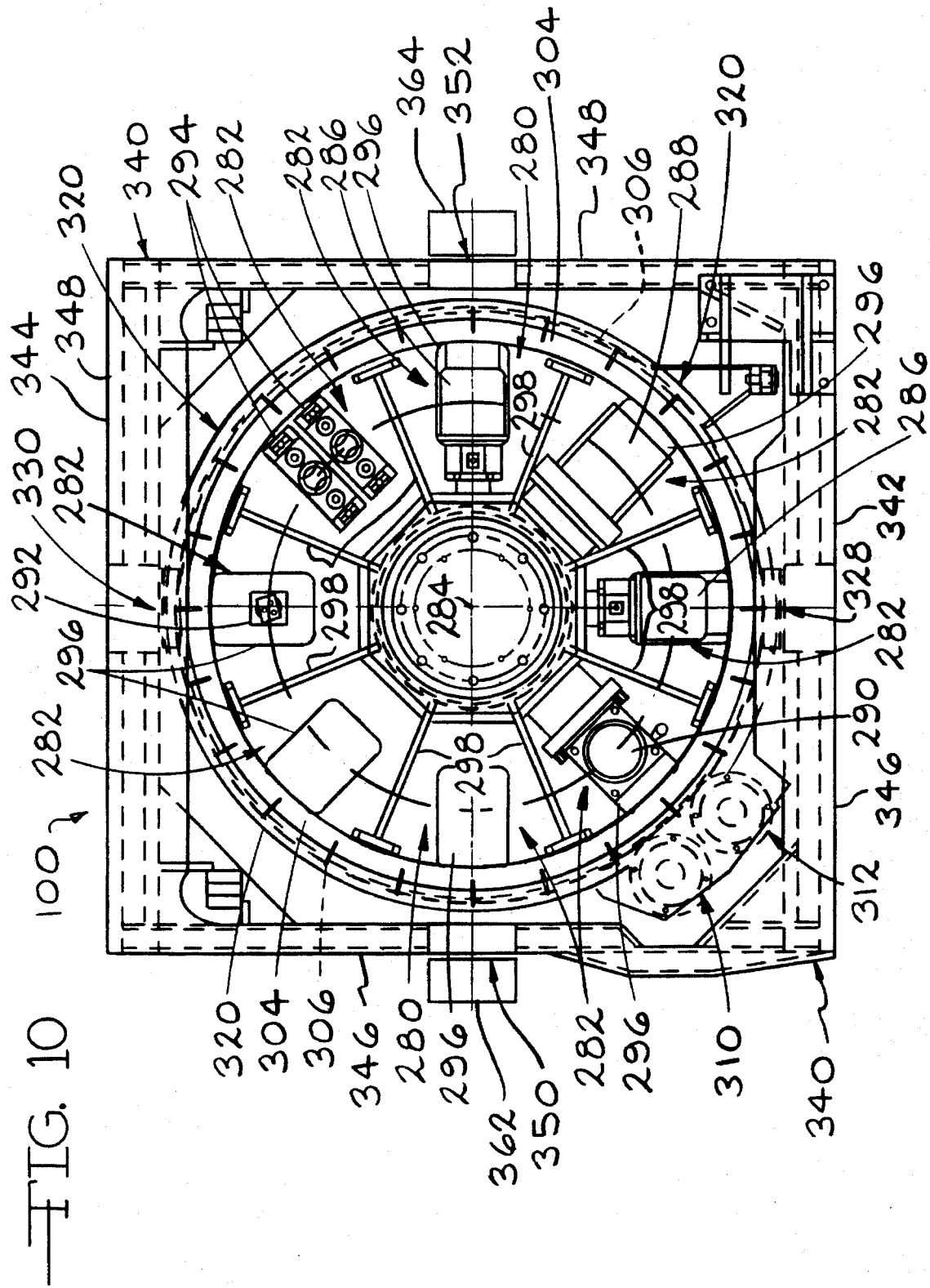
FIG. 10 is a plan view taken about line 10—10 in FIG. 4.
Figure 12:
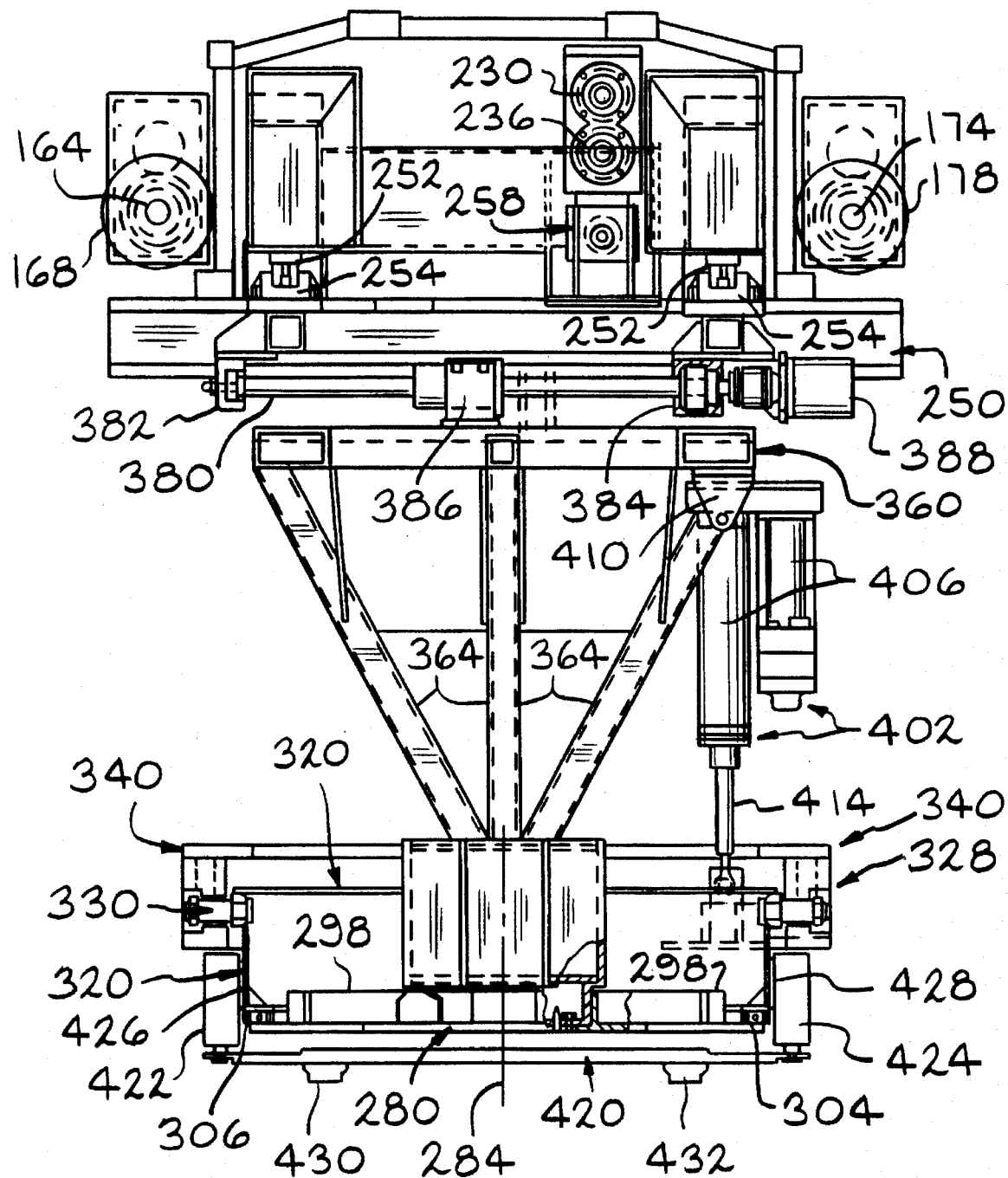
FIG. 12 is a sectional view taken about line 12—12 in FIG. 4.

There is provided first supporting means generally designated 320 in FIGS. 10–12 operatively coupled to transfer means 280 for supporting the transfer means 280 for rotating about the C axis 284. Supporting means 320 is in the form of a cylindrical drum which holds the fixed side of ring bearing 304 and which supports the motor/gearbox 310, 312. Actually, supporting means 320 structurally approximates a rolled I-beam with the lower flange thereof affixed to the stationary portion of ring bearing 304. Gimballing trunnion pivots generally designated 328 and 330 are provided on drum 320 at diametrically opposite locations thereon and along the Y axis, above and in parallel to workpoints on the surface of the workpiece which will be described. The trunnion pivots 328, 330 play a role in movement of head means 100 about the b axis which will be described.

There is also provided second supporting means generally designated 340 operatively coupled to the first supporting means 320 and also coupled to the X-1 axis frame by means to be described, which second supporting means 340 supports the first supporting means. In particular, second supporting means 340 is of rectangular configuration including four sections 342, 344, 346 and 348 of substantially equal length joined at their respective ends to define a square-shaped structure as shown in FIG. 10. Second supporting means 340 supports first supporting means 320 by means of the trunnions 328 and 330 which are in members 342 and 344. Another set of trunnion bearings 350, 352 is provided in supporting means 340, in particular in the members 346 and 348 and are aligned on an axis perpendicular to the axis of trunnions 328, 330. Trunnions 350, 352 play a role in movement of head means 100 about the a-1 axis in a manner which will be described.

The second supporting means 340 is movably carried by the X-1 axis frame 250 by a frame structure generally designated 360 and referred to herein as the Y axis frame. It includes a pair of A-shaped side frames 362 and 364 connected at the lower ends to members 346 and 348 of supporting means 340. The upper portion of Y axis frame 360 as viewed in FIGS. 2 and 4 is coupled to X-1 axis frame 250 through rails 368 and 370 on frame 250 and bearings 372 and 374 on side frames 362 and 364. Frame 360 is moved along the Y axis, i.e., in a direction substantially perpendicular to the longitudinal axis of workpiece 14, by a Y axis drive arrangement comprising a ballscrew 380 rotatably mounted in bearings 382, 384 fixed to X-1 axis frame 250, a nut member 386 fixed to Y axis frame 360 and threaded on ballscrew 380 and a motor/gearbox 388 drivingly connected to screw 380. The location of Y axis frame 360 is determined by a suitable encoder arrangement in a known manner.

There is provided means for pivoting the first supporting means 320 about the b axis which is disposed substantially perpendicular to the longitudinal axis of workpiece 14. As shown in FIGS. 4 and 11 a linear actuator 390 is carried by second supporting means 340 and is operatively connected to first supporting means 320. In particular, the housing 392 of actuator 390 is mounted on second supporting means 340 via brackets 394 and the screw 396 of actuator 390 is connected to first supporting means 320 at a location on an axis substantially parallel to the axis about which supporting means 320 is to be pivoted, i.e., the b axis. Thus, extension and retraction of screw 396 results in first supporting means 320 being pivoted in either direction about the b axis which extends through trunnion bearings 328, 330.

There is also provided means for pivoting the second supporting means 340 about the a-1 axis which is disposed substantially parallel to the longitudinal axis of workpiece 14 and perpendicular to the b axis. As shown in FIGS. 11 and 12, a pair of linear actuators 400, 402 are carried by Y axis frame 360 and are operatively connected to the second supporting means 340. In particular, the housings 404 and 406 of actuators 400 and 402, respectively, are mounted on Y axis frame 360 by means of brackets 408 and 410, respectively. The screws 412 and 414 of actuators 400 and 402, respectively, are connected to the second supporting means 340 at locations on a common axis substantially parallel to the axis about which supporting means 340 is to be pivoted, i.e., the a axis. Thus extension and retraction of screws 412 and 414 results in second supporting means 340 being pivoted in either direction about the axis which extends through trunnion bearings 350, 352. By way of example, in an illustrative arrangement, actuators 390, 400 and 402 each can comprise a linear actuator of the type commercially available under the designation Raco #5.

A pressure foot plate 420 is located below the tools carried by transfer disc 280 and is moved into and out of contact with workpiece 14 in a known manner by a pair of cylinders 422, 424, the rods of which are connected to opposite ends of pressure foot plate 420 and the housings of which are connected to the wall of first supporting means 320 via brackets 426, 428 as shown in FIGS. 11 and 12. Pressure foot plate 420 is provided with two pressure foot bushings 430 and 432, the centers of which are located on a line passing through the c axis, equidistant from the c axis, and located at a distance from the c axis such that tools carried by transfer disc 280 can be rotated to and from alignment with the bushings 430 and 432 during operations performed on workpiece 14.

The operation of the tool positioning method and apparatus according to the present invention is illustrated by considering its use in riveting the skin lap splices and butt splices of an airplane fuselage. An illustrative form of control system (not shown) for controlling the outer and inner positioning systems 10 and 12, respectively, is an adaptive and master-slave type of control. Briefly, the control system is adaptive in that it senses the locations of structural formations on the inner surface of workpiece 14 such as lap joint and butt joint edges, stringers and frames and then controls movement of inner positioning system 12 in relation to those structural formations. The control system is master-slave in that once the inner positioning system 12 is moved into position, the outer positioning system is moved in accordance with the location of the inner positioning system 12. Inasmuch as the control system forms no part of the present invention, any further detailed description thereof is believed to be unnecessary. However, reference may be made to the aforementioned pending patent application Ser. No. 08/048,420 for any additional information on such a control system as may be desired.

Under control of a system such as the foregoing illustrative control system, the inner positioning system 12 is moved first to the location of fastener installation by operation of the carriage means 20, arm means 30 and inner head means 32 previously described in connection with FIG. 1. The operation of the inner positioning system 12 forms no part of the present invention, but if desired a more detailed description of such operation may be found in the above-referenced patent application Ser. No. 08/048,420. Next, the outer positioning system 10, and the rotary head means 100 thereof, is moved into position in opposition to the inner system 12 by operation of outer frame means 40 and drive means 76 and 78 therefor, movement of X-1 axis frame structure 250 and the drive arrangement 258 therefor, movement of a axis carriage means 110 and the motive arrangement therefor and movement of Z axis carriage means 200 and the drive arrangement therefor all as previously described hereinabove.

With the outer 10 and inner 12 positioning systems in general alignment on opposite surfaces of workpiece 14, head means 100 is normalized to the outer surface of workpiece 14. This is accomplished by pivoting head means 100 about the a and b axes. In particular, linear actuator 390 is operated as previously described to pivot the first supporting means 320 about the trunnion bearings 328, 330 and hence about the b axis, the direction of pivoting depending upon the location, and hence the nature of the curvature, along the length of workpiece 14 where head means 100 is located. In addition to pivoting of supporting means 320 about the b axis, the foregoing normalization procedure also involves movement of head means 100 along the X-1 axis. This is because the gimbal pivots 328, 330 are spaced from, i.e., above, the workline which extends along the plane containing the work-contacting surfaces of pressure foot bushings 430 and 432. Thus, any b axis pivoting motion of head means 100 requires corresponding X-1 axis translation motion of head means 100 to replicate rotation of the tooling about the workline, i.e., to pivot the tool while keeping the tip of the tool at a location in alignment with the workpoint or work axis. The direction of X-1 movement is determined by the direction of b axis pivoting, and such X-1 movement of head means 100, of course, is provided by movement of X-1 axis frame structure 250 as previously described.

Similarly, linear actuators 400 and 402 are operated as previously described to pivot the second supporting means 340 about the trunnion bearings 350, 352 and hence about the a-1 axis, the direction of pivoting depending upon the location, and hence the nature of the curvature, along the convex surface portion of workpiece 14 where head means 100 is located. This, of course, is the curvature along the direction in the plane perpendicular to the longitudinal axis of workpiece 14, i.e., along the direction of travel of a axis carriage 110 as shown in FIG. 1. In addition to pivoting of supporting means 340 about the a-1 axis, the foregoing normalization procedure also involves movement of head means 100 along the Y axis. This is because the gimbal pivots 350, 352 are spaced from, i.e., above, the workline which extends along the plane containing the work-contacting surfaces of pressure foot bushings 430 and 432. Thus, any a-1 axis pivoting motion of head means 100 requires corresponding Y axis translation motion of head means 100 to replicate rotation of the tooling about the workline, i.e., to pivot the tool while keeping the tip of the tool at a location in alignment with the workpoint or work axis. The direction of Y movement is determined by the direction of a-1 axis pivoting, and such Y movement of head means 100, of course, is provided by movement of Y axis frame 360 as previously described.

As previously described, the second supporting means 340 surrounds and supports the first supporting means 320 at the trunnion bearings 328, 330 and loads are carried through the box-section weldment comprising supporting means 340 to the a axis trunnions 350, 352. These trunnions 350, 352 have a common axis aligned with a centerline passing through the c axis, but the workline associated with the tools is offset from that centerline by the common radial distance of the tools from the c axis. Accordingly, the two linear actuators 400 and 402 are provided for pivoting the second supporting means 340 and they are located at equal distances from the workpoint to minimize eccentric load paths.

In conjunction with the normalization procedure described hereinabove, head means 100 on the outer positioning system 10 and the head on the inner positioning system are maintained in alignment. By way of example, in an illustrative situation where workpiece 14 is of nonmagnetic material such as aluminum, a pair of magnetic flux sensors can be provided on pressure foot plate 420 of outer positioning system 10 and a pair of ferrous, i.e., magnetic, targets are provided on the clamp sleeve of the inner positioning system 12. The relative positions between the sensors and targets are predetermined such that the sensors obtain peak signals when the inner and outer heads are in proper alignment on opposite sides of workpiece 14. Inasmuch as the alignment system per se forms no part of the present invention, any further detailed description thereof is believed to be unnecessary. However, reference may be made to the aforementioned pending patent application Ser. No. 08/048,420 for any additional information on such a control system as may be desired.

After alignment of the inner and outer heads and normalization of head means 100 with the outer surface of workpiece 14 as previously described, pressure foot plate 420 is moved toward workpiece 14 to place either of the pressure foot bushings 430 or 432 into contact with the workpiece 14. The particular bushing 430, 432 used is determined by the positional relationship of head means 100 to the location of fastener installation on workpiece 14. Then an automatic drilling, rivet insertion and bucking cycle is executed. In particular, motors 310 and 312 are operated to rotate transfer plate 280 to place selected tools in registry with the pressure foot bushing and the work axis. After each tool performs its operation on workpiece 14, transfer plate 280 is rotated by motors 310, 312 to place the next selected tool in alignment with the pressure foot bushing and work axis. The foregoing indexing of the tools by rotation of transfer plate 280 is performed until all of the selected tools have performed their operations on workpiece 14. Upon completion of the cycle, the inner and outer heads unclamp and retract to the stroke level. The foregoing operations are repeated at the location of the next fastener installation.

The provision of the two bushings 430 and 432 on pressure foot plate 420 together with the provision of linear translation in the Y axis direction enables head means 100 to extend its capability of reaching locations on workpiece 14 along the path of travel of a axis carriage means 110. In particular, and referring to FIG. 1, assume that a axis carriage 110 moves from the solid line position to the left and beyond the dotted line position illustrated in FIG. 1 to the end of its path of travel along within frame means 40. In this position, pressure foot bushing 430 can be employed and the tools indexed into alignment with bushing 430. Bushing 430 is located further leftward as viewed in FIGS. 1 and 11 from the midpoint of a axis carriage 110 and this alone enables head means 100 to extend its reach or capability in this direction. This is enhanced by movement of Y axis frame 360 leftward as viewed in FIGS. 1, 11 and 12 to enable head means 100 to reach fastener installation locations further along workpiece 14 in this direction. By proceeding through a similar analysis, head means 100 has enhanced capability in the opposite direction, i.e., beyond the right-hand maximum travel of a axis carriage means 110 as viewed in FIGS. 1, 11 and 12, by virtue of pressure foot bushing 432 being located further rightward from the center of a axis carriage 110 and movement of Y axis frame 360 to the right as viewed in FIG. 1. In the illustrative application of the tool positioning method and apparatus of the present invention to an airplane fuselage, head means 100 has the capability of locating lap joints located at 89 degrees of angular travel along workpiece 14 in either direction from the intersection of a vertical plane with workpiece 14 as viewed in FIG. 1. In other words, head means 100 has the capability of reaching location along the path of travel of a axis carriage means 110 from the solid line position shown in FIG. 1 to locations along workpiece 14 displaced angularly in either direction a distance of 89 degrees.

It is therefore apparent that the present invention accomplishes its intended objectives. While an embodiment of the present invention has been described in detail, that is for the purpose of illustration, not limitation.

What is claimed is:

1. Apparatus for positioning tooling with respect to a curvilinear workpiece having a longitudinal axis comprising:

a) head means for supporting a plurality of tools at spaced locations around a central axis wherein each of said tools has an operational axis disposed substantially parallel to said central axis;

b) means for moving said head means along a path substantially parallel to the longitudinal axis of said workpiece;

c) means for moving said head means along a path corresponding to the curvature of said workpiece and in a plane disposed substantially perpendicular to said workpiece longitudinal axis;

d) means for moving said head means along a path substantially perpendicular to the longitudinal axis of said workpiece;

e) means for moving said head means along a path toward and away from said workpiece;

f) means for rotating said head means about said central axis to position selected ones of said tools at a location where the tool operational axis is in alignment with a work axis of said workpiece so that said tool can operate on said workpiece;

g) means for pivoting said head means about a first axis substantially perpendicular to said central axis and substantially perpendicular to said longitudinal axis of said workpiece; and h) means for pivoting said head means about a second axis substantially perpendicular to said central axis and substantially parallel to said longitudinal axis of said workpiece.

2. Apparatus according to claim 1, further including pressure foot means operatively associated with said head means and comprising a pair of pressure foot bushings the centers of which are located on a line intersecting said central axis and which are spaced from said central axis so as to be in registry with said tools when the operational axes thereof are in alignment with a work axis of said workpiece.

3. Apparatus for positioning tooling with respect to a curvilinear workpiece having a longitudinal axis, said apparatus comprising:

a) first carriage means extending along a path corresponding to the curvature of said workpiece and moveable along said workpiece in a direction parallel to said workpiece longitudinal axis;

b) second carriage means carried by said first carriage means and movable along said path corresponding to the curvature of said workpiece and in a plane disposed substantially perpendicular to said workpiece longitudinal axis;

c) transfer means adapted for rotation about a central axis disposed substantially perpendicular to the longitudinal axis of said workpiece;

d) a plurality of tools carried by said transfer means at spaced locations about said central axis, each of said tools having an operational axis disposed substantially parallel to said central axis;

e) means operatively coupled to said second carriage means and to said transfer means for carrying said transfer means and for supporting said transfer means for rotation about said central axis;

f) means for rotating said transfer means about said central axis to position selected ones of said tools at a location where the tool operational axis is in alignment with a work axis of the workpiece;

g) means for moving said first carriage means in said direction parallel to said workpiece longitudinal axis; and h) means for moving said second carriage means along said path corresponding to the curvature of said workpiece.

4. Apparatus according to claim 3, wherein said means operatively coupled to said second carriage means and to said transfer means includes:

a) means for supporting said transfer means for pivotal movement about a first axis disposed substantially perpendicular to said central axis and substantially perpendicular to the longitudinal axis of said workpiece; and b) means for pivoting said transfer means about said first axis.

5. Apparatus according to claim 3, wherein said means operatively coupled to said second carriage means and to said transfer means includes:

a) means for supporting said transfer means for pivotal movement about a second axis disposed substantially perpendicular to said central axis and substantially parallel to the longitudinal axis of said workpiece; and b) means for pivoting said transfer means about said second axis.

6. Apparatus according to claim 3, further including pressure foot means operatively associated with said head means and comprising a pair of pressure foot bushings the center of which are located on a line intersecting said central axis and which are spaced from said central axis so as to be in registry with said tools when the operational axes thereof are in alignment with a work axis of said workpiece.

7. Apparatus for positioning tooling with respect to a curvilinear workpiece having a longitudinal axis, said apparatus comprising:

a) transfer means adapted for rotation about a central axis disposed substantially perpendicular to the longitudinal axis of said workpiece;

b) a plurality of tools carried by said transfer means at spaced locations about said central axis, each of said tools having an operational axis disposed substantially parallel to said central axis;

c) first supporting means operatively coupled to and receiving said transfer means for supporting said transfer means for rotation about said central axis;

d) second supporting means operatively coupled to and receiving said first supporting means, said first supporting means being pivotal about a first axis substantially normal to said central axis and said second supporting means being pivotal about a second axis substantially normal to said central axis and substantially normal to said first axis;

e) means for rotating said transfer means about said central axis to position selected ones of said tools at a location where the tool operational axis is in alignment with a work axis of the workpiece;

f) means for pivoting said transfer means about said first axis;

g) means for pivoting said transfer means about said second axis; and h) carriage means operatively coupled to said second supporting means for carrying said transfer means along paths of travel relative to said workpiece.

8. Apparatus according to claim 7, wherein said first axis is disposed substantially perpendicular to the longitudinal axis of said workpiece.

9. Apparatus according to claim 7, wherein said second axis is disposed substantially parallel to the longitudinal axis of said workpiece.

10. Apparatus according to claim 7, further including pressure foot means operatively associated with said transfer means and comprising a pair of pressure foot bushings the center of which are located on a line intersecting said central axis and which are spaced from said central axis so as to be in registry with said tools when the operational axes thereof are in alignment with a work axis of said workpiece.

11. Apparatus for positioning tooling with respect to a curvilinear workpiece having a longitudinal axis, said apparatus comprising:

a) outer frame means extending about said workpiece and movable along said workpiece in a direction parallel to said workpiece longitudinal axis;

b) first carriage means movably carried by said outer frame means;

c) means for moving said first carriage means along a path corresponding to the curvature of said workpiece and in a plane disposed substantially perpendicular to said workpiece longitudinal axis;

d) second carriage means movably carried by said first carriage means;

e) means for moving said second carriage means along a path toward and away from said workpiece;

f) first inner frame means movably carried by said second carriage means;

g) means for moving said first inner frame means along a path substantially parallel to the longitudinal axis of said workpiece;

h) second inner frame means movably carried by said first inner frame means;

i) means for moving said second inner frame means along a path substantially perpendicular to the longitudinal axis of said workpiece;

j) transfer means adapted for rotation about a central axis disposed substantially perpendicular to the longitudinal axis of said workpiece;

k) a plurality of tools carried by said transfer means at spaced locations about said central axis, each of said tools having an operational axis disposed substantially parallel to said central axis;

l) first supporting means operatively coupled to said transfer means for supporting said transfer means for rotation about said central axis;

m) second supporting means operatively coupled to said first supporting means and to said second inner frame means, said first supporting means being pivotal about a first axis substantially normal to said central axis and said second supporting means being pivotal about a second axis substantially normal to said central axis and substantially normal to said first axis;

n) means for rotating said transfer means about said central axis to position selected ones of said tools at a location where the tool operational axis is in alignment with a work axis of the workpiece;

o) means for pivoting said first supporting means and with it said transfer means about said first axis; and p) means for pivoting said second supporting means and with it said transfer means about said second axis.

12. Apparatus according to claim 11, wherein said first axis is disposed substantially perpendicular to the longitudinal axis of said workpiece.

13. Apparatus according to claim 11, wherein said second axis is disposed substantially parallel to the longitudinal axis of said workpiece.

14. Apparatus according to claim 7, further including pressure foot means operatively associated with said transfer means and comprising a pair of pressure foot bushings the centers of which are located on a line intersecting said central axis and which are spaced from said central axis so as to be in registry with said tools when the operational axes thereof are in alignment with a work axis of said workpiece.

15. Apparatus according to claim 7, wherein said transfer means is generally disc-shaped, said first supporting means is generally annular in shape and receives said transfer means rotatably therein and wherein said second supporting means comprises a rectangular-shaped frame which receives said first supporting means movably therein.

16. Apparatus according to claim 15 including gimbal means for pivotally connecting said first supporting means to said second supporting means.

17. Apparatus according to claim 15 including gimbal means for pivotally connecting said second supporting means to said carriage means.

18. Apparatus according to claim 7, wherein said carriage means comprises first carriage means extending along a path corresponding to the curvature of the workpiece, second carriage means carried by said first carriage means and movable along said path and third carriage means carried by said second carriage means and movable toward and away from the workpiece.

* * * * *